A. A. CASWELL.
FISH SCREEN OR SAVER OR TRAP.
APPLICATION FILED OCT. 9, 1913.
1,115,393.
Patented Oct. 27, 1914.
2 SHEETS—SHEET 2.
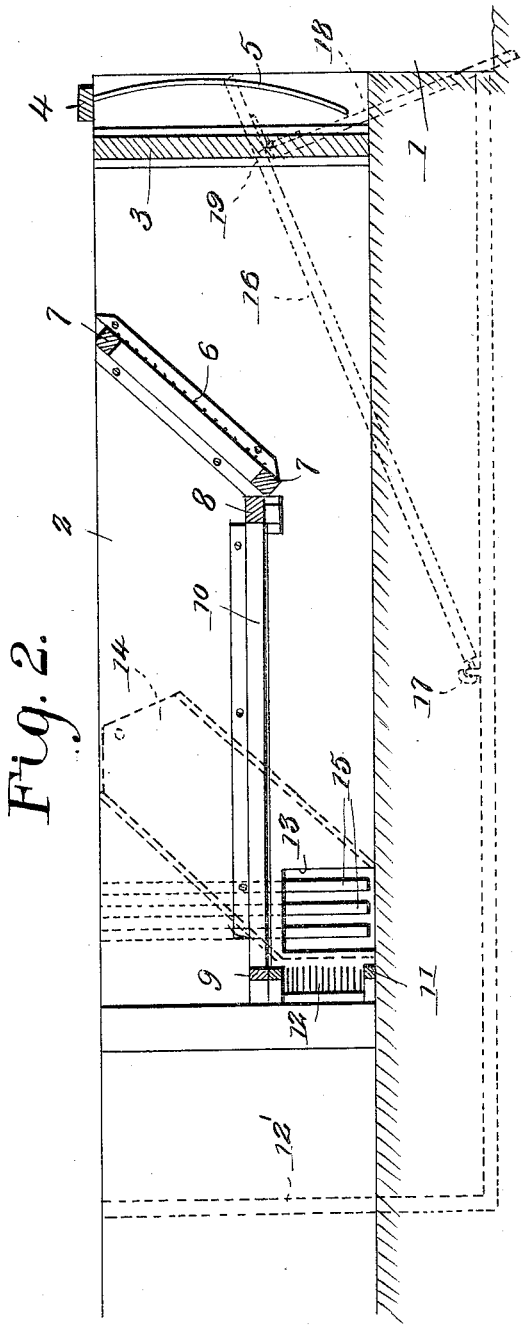
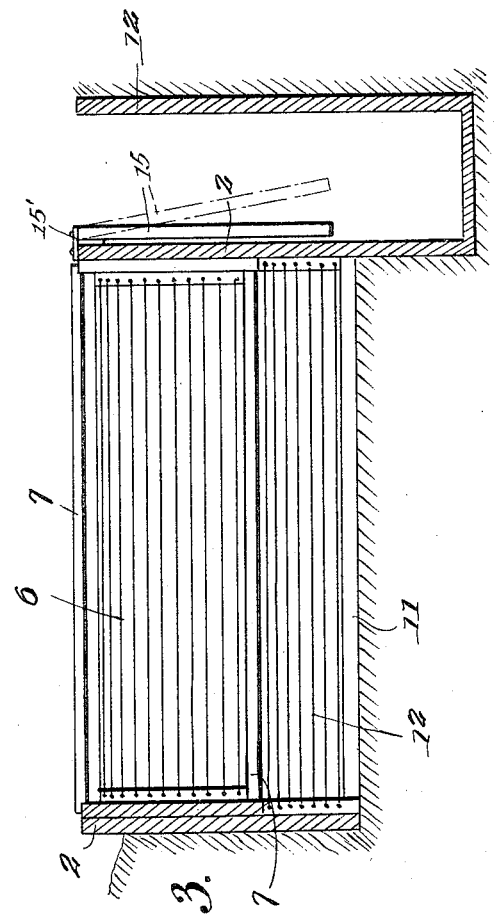
Witnesses
Wm. H. Mulligan,
Wm. E. Valk Jr.
Inventor
Andrew A. Caswell,
By Richard Darwen,
his Attorney
THE NORRIS PETERS CO., PHOTO-LITHO., WASHINGTON, D. C.

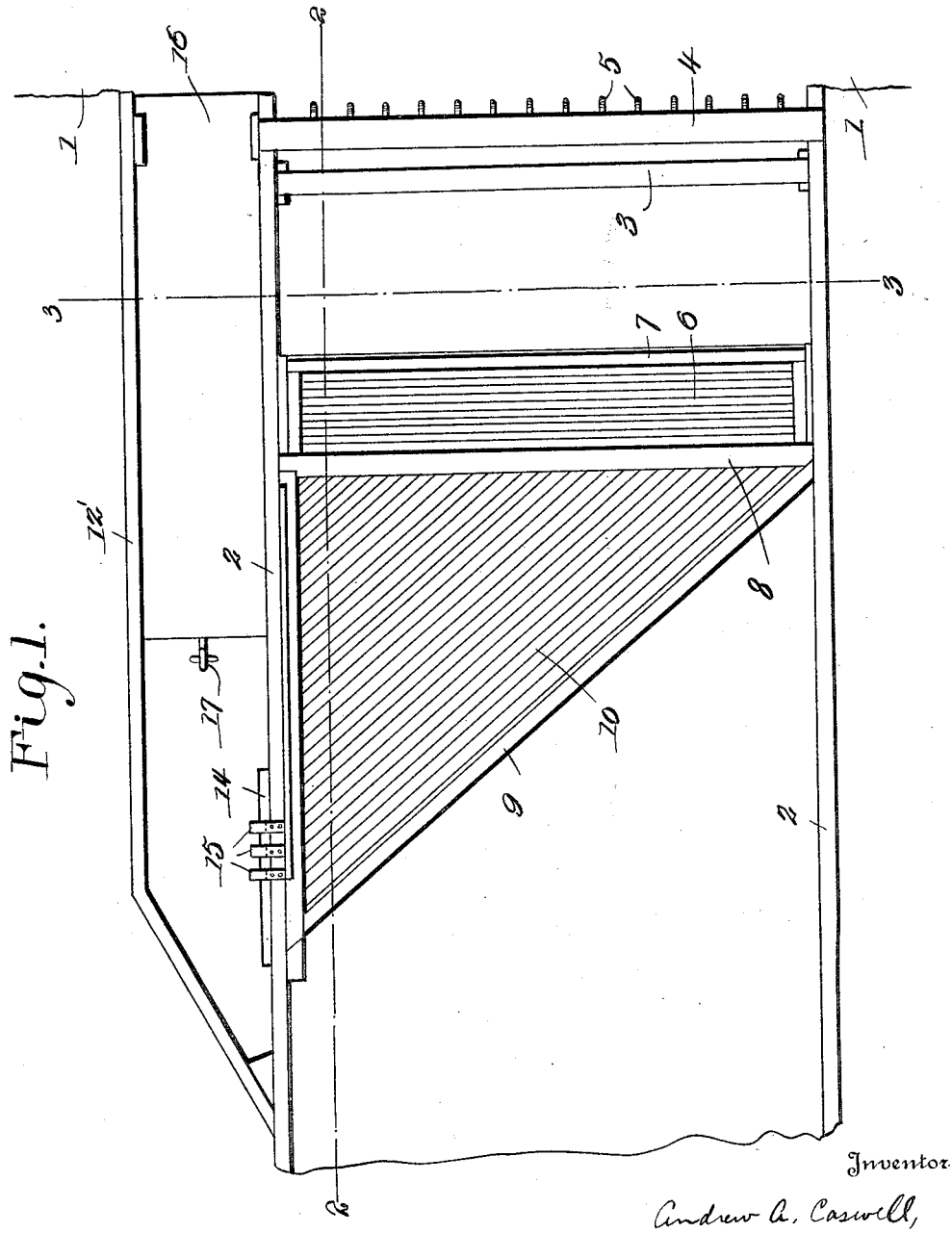

UNITED STATES PATENT OFFICE.

ANDREW A. CASWELL, OF LOS ANGELES, CALIFORNIA.

FISH SCREEN OR SAVER OR TRAP.

1,115,393.  Specification of Letters Patent.  Patented Oct. 27, 1914.

Application filed October 9, 1913. Serial No. 794,246.

*To all whom it may concern:*

Be it known that I, ANDREW A. CASWELL, citizen of the United States, residing at 1004 West Eleventh street, Los Angeles, in the county of Los Angeles and State of California, have invented certain new and useful Improvements in Fish Screens or Savers or Traps, of which the following is a specification.

This invention relates to fish screens of that general class especially designed for use in irrigating ditches, canals, flumes and the like to prevent the fish from following the course of the stream and eventually becoming stranded upon the land and in the ditches.

The object of the invention is to provide a stationary screen which when positioned in the ditch, flume or other water course will afford an effectual barrier to the passage of fish without liability of becoming clogged or otherwise obstructed by leaves, twigs and other floating debris.

A further object of the invention contemplates the provision of a supplemental or secondary trough into which the fish are permitted to swim, the said trough serving as a trap for the fish, or if desired permitting them to again reënter the stream without injury.

A still further object of the invention is to generally improve this class of devices so as to increase their utility, durability and efficiency.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a top plan view of my fish screen constructed in accordance with my invention; Fig. 2 is a sectional view taken on the line 2—2 of Fig. 1; and Fig. 3 is a sectional view taken on the line 3—3 of Fig. 1.

Referring now to the drawings, wherein is illustrated the preferred embodiment of my invention the numeral 1 designates the main water-way or stream upon the bank of which the walls 2 of the irrigating ditch are positioned, the latter being parallel and uniformly spaced apart as illustrated in Fig. 1 of the drawings.

A flood gate 3 is positioned across the mouth of the irrigating ditch to control the water supply thereto, a screen or barrier 4 being arranged adjacent the gate 3 to prevent the entrance of twigs, leaves and other floating debris into the ditch, the said screen being preferably constructed by providing a plurality of uniformly spaced apart depending teeth 5 disposed to extend entirely across the mouth of the ditch upon the outside of the gate 3.

An inclined screen 6 is disposed to extend transversely of the ditch 2 the said screen being supported by spaced apart beams 7, one of said beams being positioned at the top of the ditch 2 and the other at a point near the center thereof. Extending parallel with and adjacent the lower beams 7 is another transversely extending beam 8, which with a third inclined supporting beam 9 disposed upon the same plane forms a support for a screen member 10 the latter being triangular in form as is illustrated to advantage in Fig. 1 of the drawings. One edge of the screen member 10 extends transversely of the ditch 2 at an angle, the beam 9 being positioned directly over a cross beam 11 disposed parallel therewith, the said two beams 9 and 11 being connected and forming a support for an angularly disposed screen 12 against which the fish are directed should they enter the irrigating ditch.

Within one of the sides 2 of the ditch and at the far end of the angular screen 12 I provide an opening 13, the said opening leading into the supplementary or auxiliary ditch or trough 12' formed at one side of the main irrigating ditch 2 the latter serving as a trap or inclosure for the fish after passing through the opening 13 from the main ditch 2. A lift gate 14 is provided for the opening 13, the said gate being preferably disposed at an inclination as illustrated by dotted lines in Fig. 2 to permit opening and closing of the gate as occasion demands, suitable means being provided to facilitate the manipulation of the gate when desired. Strips 15 depend within the auxiliary ditch from one of the main ditch sides 2 thus forming a removable closure for the opening 13 the strips being supported to swing outwardly or away from the main ditch 2, thereby permitting the fish to enter the auxiliary ditch 12' and when once therein to be entrapped, as the strips automatically close the said opening and prevent a reentrance of the fish to the main ditch 2.

When it is desired that the fish should not be retained within the auxiliary ditch 12', an incline lift gate 16 is unfastened and permitted to rise and fall according to the rise and fall of the water within the main stream 1, as the said gate 16 is preferably constructed of buoyant material so that one end thereof will always be supported level with the water. The inner end of the gate 16 is pivoted to the base of the auxiliary trough 12' as at 17 to maintain the said gate at an inclination, which arrangement will permit the fish within the said trough or ditch to enter the main stream by swimming up and over the gate 16, at the same time effecting a barrier against the reëntrance of the fish to the auxiliary ditch as the inclined surface of the gate is presented only to the interior of the said ditch. A member 18 is hingedly secured as at 19 to the under side of the gate 16 near the forward end thereof, the free end of the said member resting against the bottom of the ditch 12' to form a closure therefor which automatically opens and closes according to the rise and fall of the water within the stream. The auxiliary ditch 12' is preferably constructed deeper than the main or irrigating ditch 2 to permit operation of the gate 16 in the manner above described.

From the above, taken in connection with the accompanying drawings it will be seen that the screens 6, 10 and 12 form an effectual barrier against the entrance of fish into the irrigating ditch 2 and serve as a guide leading to the opening 13 and into the auxiliary ditch or trough 12'; that the strips 15 permit passage of the fish from the main to the auxiliary ditch yet prevent a return of the fish through the said opening; and that the gate 16 is operated automatically by the rise and fall of the water within the stream. Strips of flexible material (leather for instance) as indicated at 15' may be provided to serve as hinges for the pendant strip 15.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A device for water ways including a transverse angularly disposed screen, guide screens for directing the fish within said water way against said first mentioned screen, a trough, said trough being communicant with said water way by means of an opening disposed adjacent the far end of the said first mentioned screen, and means forming a barrier positioned over said opening to prevent passage of fish from said trough to said water way, as and for the purpose set forth.

2. A device of the character described including an inclined transversely extending screen, a second screen member extending transversely of the water-way and parallel with the sides thereof, a second inclined screen extending transversely of the waterway, a supplemental trough disposed adjacent the said water-way, the said trough having an opening formed therein through which fish are adapted to pass from the said water-way into the said trough, uniformly spaced apart parallel strips depending over the said opening to form a closure therefor against the repassage of fish from the said trough to the said water-way, an inclined lift-gate adapted to be raised and lowered to open and close the said opening, a lift-gate pivoted within the said trough, the free end being supported by the water therein, and a member pendent from the said gate, as and for the purpose set forth.

3. In a device for water ways, a trough at one side of said water way, said trough being communicant with said water by means of an opening formed in one side thereof, a screen member positioned within the said water way to direct the fish therein through the said opening, and a barrier positioned over the said opening to permit passage of fish from within the said water way to the said trough and preventing a repassage of the fish within the said trough to the said water way, as and for the purpose set forth.

4. In a device for water ways, a trough communicant therewith, means for directing the fish within said water way into said trough, means preventing the repassage of fish from said trough into said water way, and means including a lift-gate pivoted within said trough, the free end of said gate being supported by the water therein, as and for the purpose set forth.

5. In a device for water ways, a trough communicant therewith, means including a screen for directing the fish within said water way into said trough, means including a plurality of pendent strips adapted to prevent the repassage of the fish from the said trough to the said water way, and a lift-gate pivoted within said trough, the free end of the said gate being supported by the water within the trough, as and for the purpose set forth.

6. In a device for water ways, a trough extending parallel with said water way at one side thereof, one end of the said trough being entirely closed, the said trough being communicant with said water way at a point adjacent the closed end of the former by means of an opening formed in one of the trough sides, a screen member disposed to extend transversely of the water way to direct the fish therein to the said opening, a plurality of pendent strips positioned over the said opening adapted to permit passage of fish from within the said water way into said trough and prevent a repassage of the fish from the said trough into said water way, means for entirely closing said opening, and means including a lift gate pivoted within said trough and movable by the water therein, said lift gate adapted to automatically open and close one end of the said trough, as and for the purpose set forth.

7. In a device for water ways, a trough at one side of said water way, one end of the said trough being permanently closed, one side of the said trough having an opening formed therein to communicate the said trough with the said water way, a screen member extending transversely of the said water way, said screen member being positioned to guide the fish within the said water way to the said opening, a plurality of pendent strips disposed over the said opening, said strips adapted to be removed by the passage of fish from the said water way into said trough and to automatically close said opening to prevent repassage of fish from said trough into said water way, a lift-gate pivoted within said trough, said lift gate being supported to close one end of the said trough by the water within said trough, and a member pendent from said gate, as and for the purpose set forth.

In testimony whereof I affix my signature in presence of two witnesses.

ANDREW A. CASWELL.

Witnesses:
JACOB INNIS,
EVALYN N. SPARKS.

---

Copies of this patent may be obtained for five cents each, by addressing the "Commissioner of Patents, Washington, D. C."